US009660765B1

(12) United States Patent
Suresh et al.

(10) Patent No.: US 9,660,765 B1
(45) Date of Patent: May 23, 2017

(54) METHOD AND APPARATUS FOR BROADCAST INFORMATION RECEPTION IN WIRELESS COMMUNICATION SYSTEMS

(71) Applicant: MBIT WIRELESS, INC., Newport Beach, CA (US)

(72) Inventors: Keerthivasan Suresh, Puducherry (IN); Kirubakaran Ponnurangam, Puducherry (IN); Krishnavelan Sivaraman, Puducherry (IN)

(73) Assignee: MBIT WIRELESS, INC., Irvine, CA (US)

( * ) Notice: Subject to any disclaimer, the term of this patent is extended or adjusted under 35 U.S.C. 154(b) by 50 days.

(21) Appl. No.: 14/797,671

(22) Filed: Jul. 13, 2015

(51) Int. Cl.
| | | |
|---|---|---|
| *H03M 13/00* | (2006.01) | |
| *H04L 1/00* | (2006.01) | |
| *H04W 72/04* | (2009.01) | |
| *H04L 12/26* | (2006.01) | |
| *G06F 11/10* | (2006.01) | |
| *H04L 1/18* | (2006.01) | |

(52) U.S. Cl.
CPC ........ *H04L 1/0045* (2013.01); *G06F 11/1004* (2013.01); *H04L 1/0061* (2013.01); *H04L 1/1812* (2013.01); *H04L 43/0864* (2013.01); *H04L 43/50* (2013.01); *H04W 72/042* (2013.01)

(58) Field of Classification Search
None
See application file for complete search history.

(56) References Cited

U.S. PATENT DOCUMENTS

| | | | | |
|---|---|---|---|---|
| 8,625,703 | B2 * | 1/2014 | Ko ................... | H04B 7/0639 375/133 |
| 2009/0016351 | A1 * | 1/2009 | Patel ................ | H04L 1/0083 370/392 |
| 2012/0182950 | A1 * | 7/2012 | Chung .............. | H04L 5/0053 370/329 |
| 2012/0218882 | A1 * | 8/2012 | Ko ................... | H04L 1/1607 370/216 |
| 2013/0058306 | A1 * | 3/2013 | Noh ................. | H04L 1/1671 370/329 |
| 2014/0029561 | A1 * | 1/2014 | Kim ................. | H04W 72/042 370/329 |
| 2014/0050130 | A1 * | 2/2014 | Kim ................. | H04L 5/001 370/280 |
| 2014/0050191 | A1 * | 2/2014 | Kim ................. | H04L 5/001 370/329 |

(Continued)

*Primary Examiner* — Daniel McMahon
(74) *Attorney, Agent, or Firm* — Lerner, David, Littenberg, Krumholz & Mentlik, LLP

(57) ABSTRACT

Low latency wireless communication applications require highly dynamic allocation of resources. Providing allocation information on a highly dynamic basis increases the overhead of control signaling for allocation. A technique known as blind decoding is used to reduce the control signaling overhead for allocation information. However, blind decoding may occasionally lead to invalid detection of allocation messages which in turn may lead to a number of problems such as wasted bandwidth, increased power consumption, reduced throughput, etc. A method and apparatus are disclosed that detect the invalid allocation messages by maintaining a record of previously received allocation messages and using it to check the validity of the newly received allocation messages.

25 Claims, 12 Drawing Sheets

(56) References Cited

U.S. PATENT DOCUMENTS

| | | | |
|---|---|---|---|
| 2014/0153515 A1* | 6/2014 | Chun | H04L 5/0007 370/329 |
| 2015/0282208 A1* | 10/2015 | Yi | H04W 72/121 370/329 |
| 2016/0013903 A1* | 1/2016 | Kim | H04J 11/005 370/329 |

* cited by examiner

FIG. 2
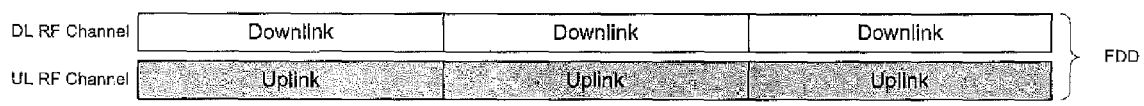
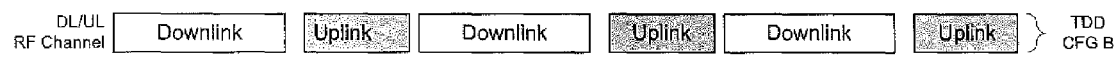
(Prior Art)

PDCCHs mapped to
Control Region (Prior Art)

(Prior Art)

FIG. 8

| TDD CFG | Minimum HARQ RTD for each subframe | | | | | | | | | |
|---|---|---|---|---|---|---|---|---|---|---|
| SFN | 0 | 1 | 2 | 3 | 4 | 5 | 6 | 7 | 8 | 9 |
| 0 | 8 | 8 | | | | 8 | 10 | | | |
| 1 | 11 | 10 | | | 8 | 11 | 10 | | | 8 |
| 2 | 11 | 10 | | 8 | 12 | 11 | 10 | | 8 | 12 |
| 3 | 8 | 15 | | | | 11 | 10 | 10 | 9 | 9 |
| 4 | 16 | 15 | | | 12 | 11 | 11 | 10 | 9 | 8 |
| 5 | 16 | 15 | | 13 | 12 | 11 | 10 | 9 | 8 | 17 |
| 6 | 11 | 11 | | | | 11 | 11 | | | 9 |

FIG. 9    900

METHOD AND APPARATUS FOR BROADCAST INFORMATION RECEPTION IN WIRELESS COMMUNICATION SYSTEMS

BACKGROUND

Typically, as shown in FIG. 1, a wireless communication system 10 comprises elements such as client terminal or mobile station 12 and base stations 14. Other network devices which may be employed, such as a mobile switching center, are not shown. In some wireless communication systems there may be only one base station and many client terminals while in some other communication systems such as cellular wireless communication systems there are multiple base stations and a large number of client terminals communicating with each base station.

As illustrated, the communication path from the base station (BS) to the client terminal direction is referred to herein as the downlink (DL) and the communication path from the client terminal to the base station direction is referred to herein as the uplink (UL). In some wireless communication systems the client terminal or mobile station (MS) communicates with the BS in both DL and UL directions. For instance, this is the case in cellular telephone systems. In other wireless communication systems the client terminal communicates with the base stations in only one direction, usually the DL. This may occur in applications such as paging.

The base station to which the client terminal is communicating with is referred as the serving base station. In some wireless communication systems the serving base station is normally referred as the serving cell. While in practice a cell may include one or more base stations, a distinction is not made between a base station and a cell, and such terms may be used interchangeably herein. The base stations that are in the vicinity of the serving base station are called neighbor cell base stations. Similarly, in some wireless communication systems a neighbor base station is normally referred as a neighbor cell.

Duplexing refers to the ability to provide bidirectional communication in a system, i.e., from base station to client terminals (DL) and from client terminals to base station (UL). There are different methods for providing bidirectional communication. One of the commonly used duplexing method is the Frequency Division Duplexing (FDD). In FDD wireless communication systems, two different frequencies, one for DL and another for UL are used for communication. In FDD wireless communication system, the client terminals may be receiving and transmitting simultaneously.

Another commonly used method is the Time Division Duplexing (TDD). In TDD based wireless communication systems, the same exact frequency is used for communication in both DL and UL. In TDD wireless communication systems, the client terminals may be either receiving or transmitting but not both simultaneously. The use of the RF channel for DL and UL may alternate on periodic basis. For example, in every 5 ms time duration, during the first half, the RF channel may be used for DL and during the second half, the RF channel may be used for UL. In some communication systems the time duration for which the RF channel is used for DL and UL may be adjustable and may be changed dynamically. In some communication systems, a predefined set of configurations may be used to select between different DL and UL duration ratios as shown in FIG. 2. These predefined configurations are referred herein as TDD configurations.

Yet another commonly used duplexing method is the Half-duplex FDD (H-FDD). In this method, different frequencies are used for DL and UL but the client terminals may not perform receive and transmit operations at the same time. Similar to TDD wireless communication systems, a client terminal using H-FDD method must periodically switch between DL and UL operation. All three duplexing methods are illustrated in FIG. 2.

The $3^{rd}$ Generation Partnership Project (3GPP) Long Term Evolution (LTE) wireless communication system is designed for low latency and high throughput applications. Supporting such applications requires the allocation of resources in a dynamic manner. This is different from the previous generation wireless communication systems which were designed for allocations that do not change for tens of seconds and even minutes or hours. In 3GPP LTE wireless communication system the resource allocation may change once every millisecond both in DL and UL.

The cost of such dynamic resource allocation is that the overhead for allocating resources is incurred every millisecond. To keep the overhead of resource allocation low while keeping the allocation dynamic, the 3GPP LTE wireless communication system employs several techniques. A control channel, called Physical Downlink Control Channel (PDCCH), is designed for the purpose of dynamic resource allocation. The resource allocation message which is transmitted using the PDCCH is called Downlink Control Information (DCI). One of the requirements for a base station in 3GPP LTE wireless communication system is the flexibility in addressing (sending resource allocation to) a particular client terminal through the PDCCH. This flexibility in turn requires the client terminal to search all possible PDCCH candidates within the control region of a subframe (SF) for possible resource allocation to it as shown in FIG. 3. This is referred herein as blind PDCCH decoding and the portion of the control region in which the PDCCH search is performed is referred to as search space. The maximum number of decoding attempts in blind PDCCH decoding is 44 as specified in Release 8 and Release 9 of the specifications of 3GPP LTE wireless communication system. In Release 10 of specifications of 3GPP the LTE-Advanced wireless communication system the number of candidates for blind PDCCH decoding is increased even more. Furthermore, the increase in blind PDCCH decoding attempts for 3GPP LTE-Advanced wireless communication system may be proportional to the number of carriers supported for Carrier Aggregation.

The information in PDCCH is protected by Forward Error Correction (FEC) coding as well as error detection. The error detection is based on a 16-bit Cyclic Redundancy Check (CRC). Different client terminals are identified in the 3GPP LTE wireless communication system using a type of identifier known as Radio Network Temporary Identifier (RNTI). Some RNTIs are of broadcast type which address more than one client terminal in a cell, whereas other RNTIs address a particular client terminal. In a PDCCH, a particular client terminal is addressed by the base station by scrambling the 16-bit CRC with the intended RNTI as shown in FIG. 4. The intended RNTI may be a broadcast RNTI or client terminal specific RNTI. The purpose of using the RNTI to scramble the CRC rather than including the RNTI in the payload is to reduce the payload length to reduce overhead as well as to improve the performance of the FEC.

In the client terminals during blind PDCCH decoding, the input to the PDCCH decoder may be from the signal transmitted by the serving base station or some random noise and interference signals from parts of the downlink signal where the serving base station may not be transmitting any information at all or may be transmitting information intended for other client terminals. In a given subframe only a few (typically two) out of the 44 blind PDCCH decoding attempts may have a useful signal transmitted by the serving base station intended for a particular client terminal. In case a client terminal decodes a PDCCH with matching CRC and RNTI matching its own when the base station signal is not actually transmitting a PDCCH for that client terminal, it is defined herein as invalid PDCCH decoding. The probability that a random 16-bit pattern matches the CRC for the payload portion of the data is $1/2^{16}$. Considering that there are 44 blind PDCCH decoding attempts made by the client terminal per subframe (1 ms), the probability of getting an invalid PDCCH decoding per subframe is $44/2^{16}$. Furthermore, the PDCCH CRC is checked in conjunction with multiple RNTIs that may be configured by the evolved Node B (eNB) for the client terminal. For example, if on average two identifiers may be used by the client terminal at any given time, the probability of invalid PDCCH detection increases by a factor of two, i.e., $(2*44)/2^{16}$. This translates to about 0.00134 per millisecond or about 1.34 invalid PDCCH CRC pass per second. In case of 3GPP LTE-Advanced wireless communication system with Carrier Aggregation (CA), this probability grows higher in proportion to the number of component carriers and the additional number of blind decoding attempts.

The invalid PDCCH detection may lead to invalid DCI payload which in turn may lead to invalid resource allocation. The terms invalid PDCCH and invalid DCI are used interchangeably herein. Such invalid PDCCH detection can cause two types of problems. If the invalid PDCCH detection is related to DL resource allocation then it may cause the client terminal to receive the DL data that does not actually contain any information for that particular client terminal. This may result in unnecessary power consumption in the client terminal. Furthermore, if there was a valid PDCCH transmitted for the client terminal in the same subframe, it may be missed since the client terminal may stop performing blind PDCCH decoding after detecting the required number of PDCCHs. This may lead to reduced throughput for the client terminal and at the same time wasted resources (allocated but unused). If there was another downlink allocation using a broadcast RNTI in the same subframe, there may be a conflict in the resources allocated by the DCI message in the invalid PDCCH and the DCI message in the valid PDCCH CRC pass for a broadcast RNTI. This may cause the client terminal to behave in unpredictable manner and could result in the client terminal not receiving the data that was intended for it.

For the UL direction, invalid PDCCH detection may result in the client terminal transmitting on resources that are not allocated to it. This may cause interference to one or more other client terminals which may be allocated those particular resources. This may lead to more power consumption and reduced throughput on all the client terminals that may be transmitting on those particular resources since the interference may lead to failed transmissions which may require retransmissions. Furthermore, if there was a valid PDCCH with UL resource allocation transmitted for the client terminal, it may be missed since the client terminal may stop performing blind PDCCH decoding after detecting the required number of PDCCHs. This may lead to reduced throughput for the client terminal and wasted resources (allocated but unused) in the UL.

The 3GPP LTE wireless communication system employs Hybrid Automatic Repeat Request (HARQ). Information regarding HARQ protocol such as the process number, the Modulation and Coding Scheme (MCS), the Redundancy Version (RV), and whether a new transmission or retransmission may be taking place is sent as part of a DCI message. Invalid PDCCH detection can cause the HARQ Finite State Machine (FSM) running at the client terminal and at the eNB to be out of synchronization. For each DL resource allocation a corresponding HARQ acknowledgement must be sent in the UL. The exact allocation of UL resources for sending the acknowledgement is implicitly based on the exact resource corresponding to the PDCCH blind decoding candidate. The invalid PDCCH decoding then in turn leads to transmission of DL HARQ ACK/NACK (positive or negative acknowledgement) in the UL direction in the wrong UL resources and possibly interfering with other client terminals that may be sending their respective DL HARQ ACK/NACK in those resources.

When a client terminal is in spatial multiplexing mode, the DCI message may contain the allocation information such as the MCS, RV, and new data indication for two codewords which may be mapped to the different layers of spatially multiplexed data transmission from the eNB. The transmission of HARQ ACK/NACK due to invalid DCI in those scenarios may cause further degradation because additional resources are used for HARQ ACK/NACK transmission.

A client terminal schedules decoding of the UL HARQ ACK/NACK for the UL transmission triggered by invalid PDCCH detection for UL resource. According to the 3GPP LTE wireless communication system HARQ protocol in UL, if a NACK is received in DL for a UL transmission, the client terminal is expected to automatically send a retransmission on the same resources as the original transmission. This process may continue till the maximum retransmissions are reached.

The invalid PDCCH decoding may lead to a series of problems that may compound both in DL and UL over a period of several radio frames.

Note that the invalid PDCCH detection rate mentioned earlier is only for one particular client terminal. A cell may typically serve a number of active users, in the order of dozens of client terminals. This means that the invalid PDCCH detection on a per subframe per cell basis can become very high and may disrupt the normal operation of the network. A method and apparatus are disclosed that enable a client terminal to filter out an invalid PDCCH detection and thereby improve throughput, reduce power consumption and may avoid wasted resources.

SUMMARY

In accordance with an aspect of the invention, a method for validating a Downlink Control Information (DCI) message in a wireless communication system may include controlling, by a processing device, for each subframe in which a DCI message is encoded and which is received at a wireless communication terminal of the wireless communication system, determining whether error correction and detection decoding of at least one code block of at least one codeword of a Physical Downlink Shared Channel (PDSCH) corresponding to a current DCI message from a current transmission time interval (TTI) is passing a CRC. In addition, the method may include controlling, by the processing device, setting of a DCI validity flag, for the subframe, to indicate: (A) True when: (i) at least one of the at least one code blocks decoded by the decoding is determined to be passing the CRC so as to satisfy a first condition, or any of the at least one codeword corresponds to retransmission and a Modulation and Coding Scheme (MCS) value indicated in the current DCI message is less than a predetermined value so as to satisfy a second condition, and (ii) an actual Hybrid Automatic Repeat Request (HARQ) Round Trip Delay (RTD) determined from the current TTI and a previous TTI for a previously validated DCI message is greater than or equal to a minimum HARQ RTD for the subframe, and (B) False when: (iii) none of the at least one code blocks decoded by the decoding is determined to pass the CRC, none of the at least one codeword corresponds to retransmission and the MCS value is not less than the predetermined value, or (iv) the actual HARQ RTD is not greater than or equal to the minimum HARQ RTD when the first condition or the second condition of (i) is satisfied.

In one alternative, the method may include, when the DCI validity flag indicates True based on the setting, controlling, by the processing device, updating of a HARQ context buffer for the previous TTI stored in a memory to the current TTI for a HARQ context buffer stored in the memory corresponding to a HARQ process in the current DCI message.

In one alternative, the method may include, when the DCI validity flag indicates False based on the setting, controlling, by the processing device, updating of a HARQ context buffer for the previous TTI stored in a memory such that the HARQ context buffer for the previous TTI is not updated to the current TTI for a HARQ context buffer stored in the memory corresponding to a HARQ process in the current DCI message.

In one alternative, the processing device may control storing in a memory, for the subframe in downlink (DL) and uplink (UL), the current TTI, the minimum HARQ RTD and information indicating the MCS value and transmission or retransmission.

In one alternative, the minimum HARQ RTD for at least one of the subframe may be determined dynamically.

In one alternative, when the wireless communication system is of a Time Division Duplexing (TDD) mode, the minimum HARQ RTD for the at least one of the subframe may be determined as a function of TDD configuration and a downlink (DL) subframe number (SFN) for the current DCI message from a table stored in a memory.

In one alternative, the method may include storing in a memory, by the processing device, the minimum HARQ RTD for the at least one of the subframe which is a current downlink (DL) subframe (SF) corresponding to a DL HARQ process number indicated in the current DCI message of the current DL SF.

In one alternative, information of the current DCI message for which the DCI validity flag indicates True may be used by the processing device to set a DCI validity flag for a subsequent DCI message from a subsequent TTI, only when a same process number is indicated in the current DCI message and the subsequent DCI message.

In one alternative, the information of HARQ for the previously validated DCI message stored in a memory may indicate a setting of True for a DCI validity flag corresponding to the previously validated DCI message.

In one alternative, the setting may update the DCI validity flag to True from an initial setting of False when at least one of the at least one code blocks decoded by the decoding is determined to be passing the CRC, or any of the at least one codeword corresponds to the retransmission and the MCS value is less than the predetermined value, and the processing device may determine whether (ii) is satisfied only when the DCI validity flag is updated to indicate True, and update the DCI validity flag to indicate False when (ii) is determined to be not satisfied.

In one alternative, when the DCI validity flag is updated to indicate False based on a determination (ii) is not satisfied, the processing device may control storing in a memory information for the current DCI message indicating the current DCI message is invalid.

In one alternative, the setting may update the DCI validity flag to True from an initial setting of False when at least one of the at least one code blocks decoded by the decoding is determined to be passing the CRC.

In one alternative, the setting may update the DCI validity flag to True from an initial setting of False when (i) none of the at least one code blocks is determined to be passing the CRC and (ii) any of the at least one codeword corresponds to the retransmission and the MCS value is less than the predetermined value.

In one alternative, the setting may update the DCI validity flag to False from an initial setting of False when (i) none of the at least one code blocks decoded by the decoding is determined to be passing the CRC and (ii) all of the at least one codeword correspond to initial transmission.

In one alternative, the processing device may update a HARQ context buffer for the previous TTI stored in a memory to the current TTI for a HARQ context buffer stored in the memory corresponding to a HARQ process in the current DCI message, only when at least one of the at least one code blocks decoded by the decoding is determined to be passing the CRC.

In accordance with an aspect of the invention, an apparatus for validating a Downlink Control Information (DCI) message in a wireless communication system may include circuitry configured to control: determining, for each subframe in which a DCI message is encoded and which is received at a wireless communication terminal of the wireless communication system, whether error correction and detection decoding of at least one code block of at least one codeword of a PDSCH corresponding to a current DCI message from a current transmission time interval (TTI) is passing a CRC; and setting of a DCI validity flag, for the subframe, to indicate (A) True when: (i) at least one of the at least one code blocks decoded by the decoding is determined to be passing the CRC so as to satisfy a first condition, or any of the at least one codeword corresponds to retransmission and a Modulation and Coding Scheme (MCS) value indicated in the current DCI message is less than a predetermined value so as to satisfy a second condition, and (ii) an actual Hybrid Automatic Repeat Request (HARQ) Round Trip Delay (RTD) determined from the current TTI and a previous TTI for a previously validated DCI message is greater than or equal to a minimum HARQ RTD for the subframe, and (B) False when: (iii) none of the at least one code blocks decoded by the decoding is determined to pass the CRC, none of the at least one codeword corresponds to retransmission and the MCS value is not less than the predetermined value, or (iv) the actual HARQ RTD is not greater than or equal to the minimum HARQ RTD when the first condition or the second condition of (i) is satisfied.

In one alternative of the apparatus, the circuitry may be configured to control, when the DCI validity flag indicates True based on the setting, controlling, by the processing device, updating of a HARQ context buffer for the previous TTI stored in a memory to the current TTI for a HARQ context buffer stored in the memory corresponding to a HARQ process in the current DCI message.

In one alternative of the apparatus, the circuitry may be configured to control, when the DCI validity flag indicates False based on the setting, updating of a HARQ context buffer for the previous TTI stored in a memory such that the HARQ context buffer for the previous TTI is not updated to the current TTI for a HARQ context buffer stored in the memory corresponding to a HARQ process in the current DCI message.

In one alternative of the apparatus, the setting may update the DCI validity flag to True from an initial setting of False when at least one of the at least one code blocks decoded by the decoding is determined to be passing the CRC, or any of the at least one codeword corresponds to the retransmission and the MCS value is less than the predetermined value, and the circuitry may be configured to control determining whether (ii) is satisfied only when the DCI validity flag is updated to indicate True, and updating the DCI validity flag to indicate False when (ii) is determined to be not satisfied.

In one alternative of the apparatus, the circuitry may be configured to control updating a HARQ context buffer for the previous TTI stored in a memory to the current TTI for a HARQ context buffer stored in the memory corresponding to a HARQ process in the current DCI message, only when at least one of the at least one code blocks decoded by the decoding is determined to be passing the CRC.

In accordance with an aspect of the invention, a wireless communication device may include a receiver to receive a subframe in which a DCI message is encoded; and a processing device. The processing device may be configured to control for each subframe received in which a DCI message is encoded: determining whether error correction and detection decoding of at least one code block of at least one codeword of a current DCI message from a current transmission time interval (TTI) is passing a CRC; and setting of a DCI validity flag to indicate (A) True when: (i) at least one of the at least one code blocks decoded by the decoding is determined to be passing the CRC so as to satisfy a first condition, or any of the at least one codeword corresponds to retransmission and a Modulation and Coding Scheme (MCS) value indicated in the current DCI message is less than a predetermined value so as to satisfy a second condition, and (ii) an actual Hybrid Automatic Repeat Request (HARQ) Round Trip Delay (RTD) determined from the current TTI and a previous TTI for a previously validated DCI message is greater than or equal to a minimum HARQ RTD for the subframe, and (B) False when: (iii) none of the at least one code blocks decoded by the decoding is determined to pass the CRC, none of the at least one codeword corresponds to retransmission and the MCS value is not less than the predetermined value, or (iv) the actual HARQ RTD is not greater than or equal to the minimum HARQ RTD when the first condition or the second condition of (i) is satisfied.

In one alternative of the device, the processing device may be configured to control, when the DCI validity flag indicates True based on the setting, updating of a HARQ context buffer for the previous TTI stored in a memory to the current TTI for a HARQ context buffer stored in the memory corresponding to a HARQ process in the current DCI message.

In one alternative of the device, the processing device may be configured to control, when the DCI validity flag indicates False based on the setting, updating of a HARQ context buffer for the previous TTI stored in a memory such that the HARQ context buffer for the previous TTI is not updated to the current TTI for a HARQ context buffer stored in the memory corresponding to a HARQ process in the current DCI message.

In one alternative of the device, the setting may update the DCI validity flag to True from an initial setting of False when at least one of the at least one code blocks decoded by the decoding is determined to be passing the CRC, or any of the at least one codeword corresponds to the retransmission and the MCS value is less than the predetermined value, and the processing device may be configured to control determining whether (ii) is satisfied only when the DCI validity flag is updated to indicate True, and updating the DCI validity flag to indicate False when (ii) is determined to be not satisfied.

In one alternative of the device, the processing device may be configured to control updating a HARQ context buffer for the previous TTI stored in a memory to the current TTI for a HARQ context buffer stored in the memory corresponding to a HARQ process in the current DCI message, only when at least one of the at least one code blocks decoded by the decoding is determined to be passing the CRC.

BRIEF DESCRIPTION OF THE DRAWINGS

FIG. 2 illustrates FDD, TDD and H-FDD duplexing techniques.

FIG. 8 illustrates a table for dynamic determination of RTD for a TDD system as a function of DL subframe and TDD configuration.

DETAILED DESCRIPTION

Figure 1:
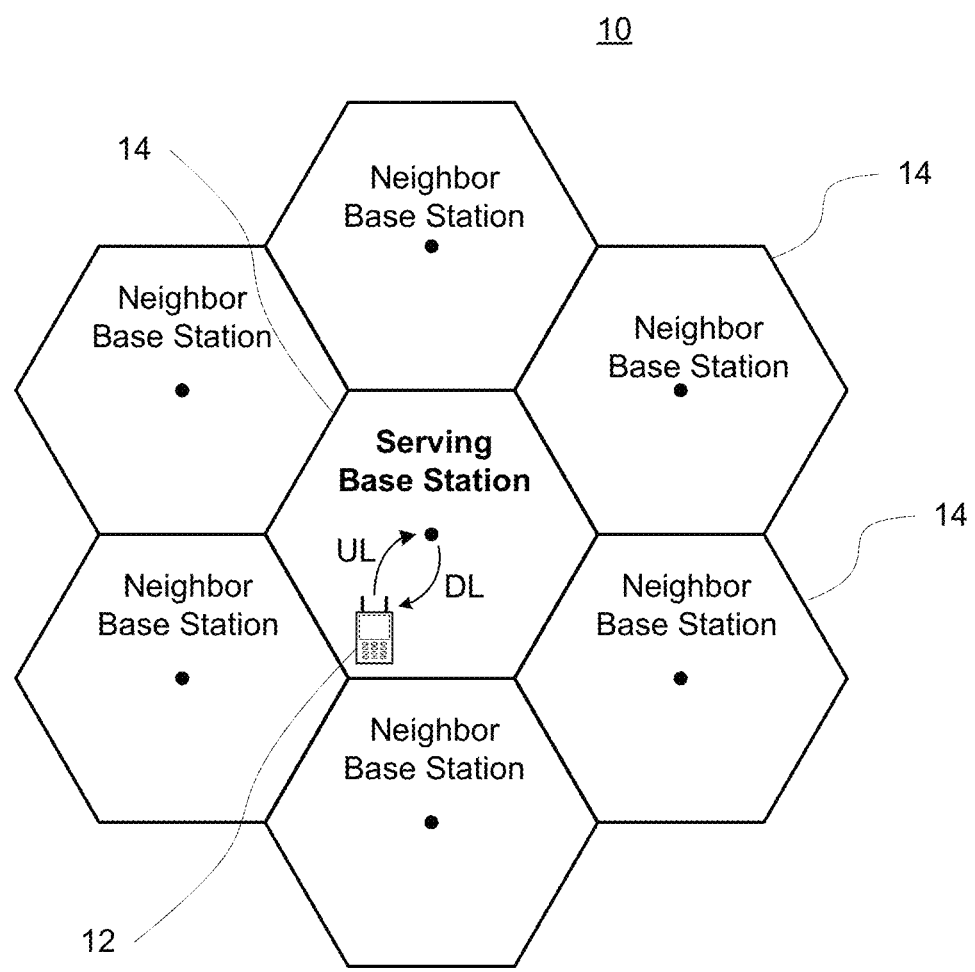
FIG. 1 illustrates a conventional wireless cellular communication system.
Figure 3:
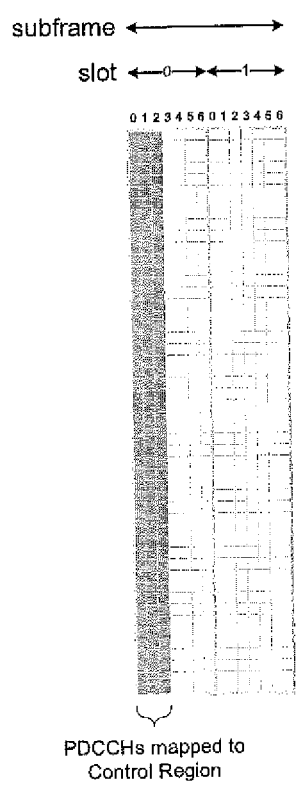
FIG. 3 illustrates a subframe including control region where PDCCHs are mapped in a 3GPP LTE wireless communication system.
Figure 4:
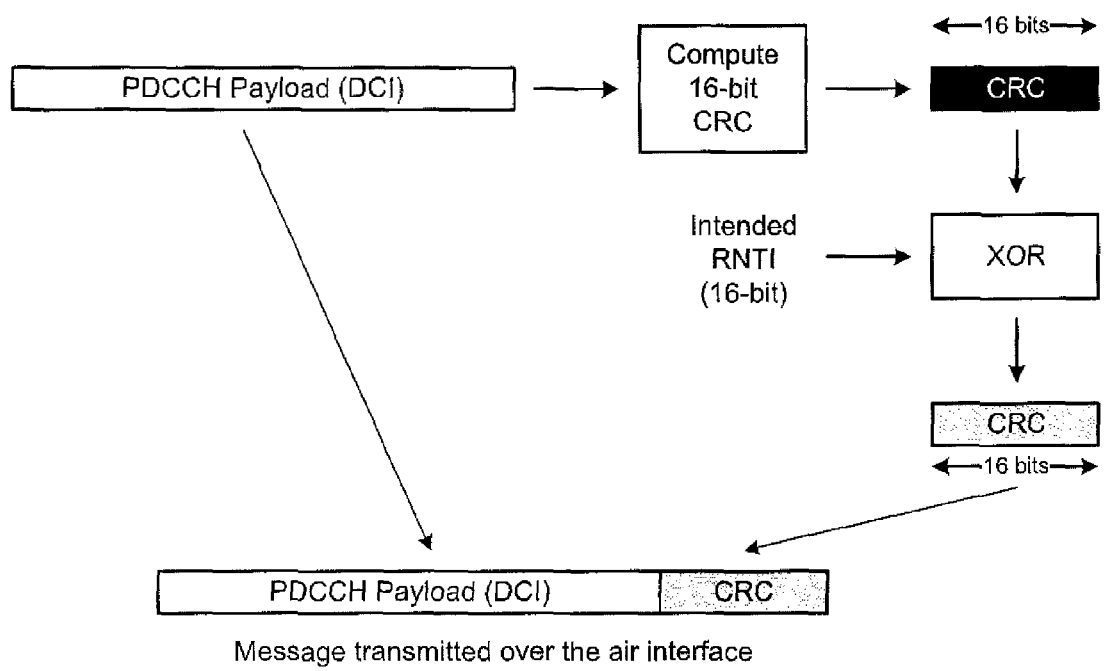
FIG. 4 illustrates the encoding of a DCI message for transmission over a PDCCH in a subframe in a 3GPP LTE wireless communication system.

The foregoing aspects, features and advantages of the present invention will be further appreciated when considered with reference to the following description of exemplary embodiments and accompanying drawings, wherein like reference numerals represent like elements. In describing the exemplary embodiments of the invention illustrated in the appended drawings, specific terminology will be used for the sake of clarity. However, the invention is not intended to be limited to the specific terms used.

Figure 5:
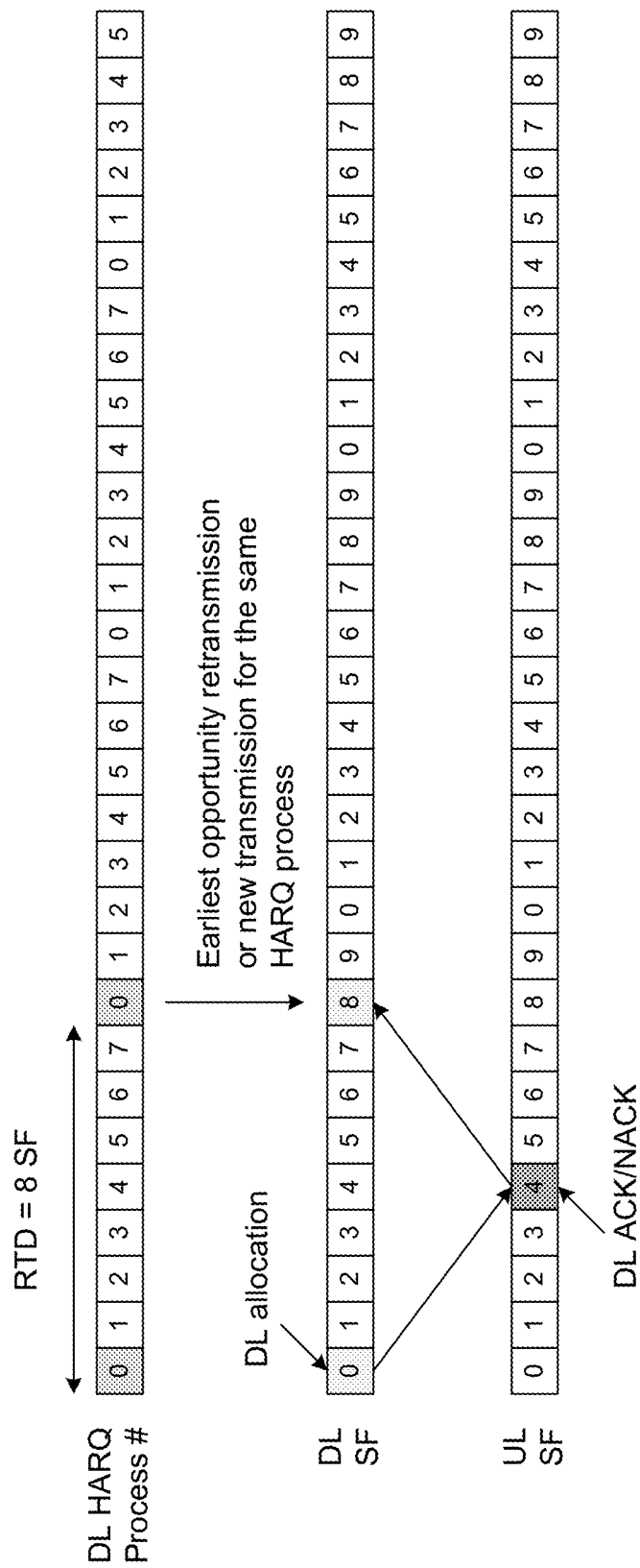
FIG. 5 illustrates the HARQ ACK/NACK and retransmission timing along with Round Trip Delay for DL in a 3GPP LTE wireless communication system.
Figure 6:
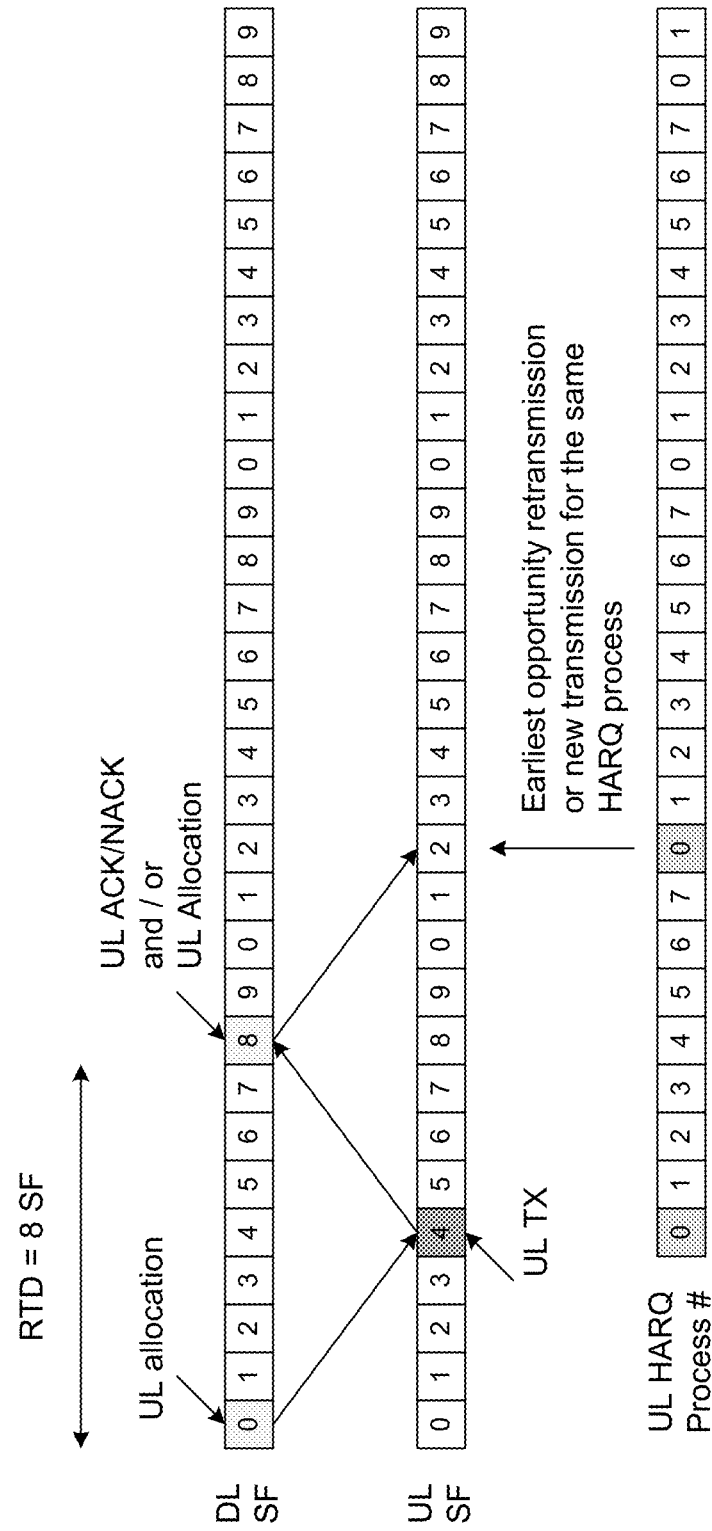
FIG. 6 illustrates the HARQ ACK/NACK and retransmission timing along with Round Trip Delay for UL in a 3GPP LTE wireless communication system.

To allow the client terminals and the base station enough time to process the received information and prepare the ACK/NACK information in response to the received information, certain minimum processing times are defined in the 3GPP LTE wireless communication system specifications. For example, in case of FDD, the acknowledgement for a DL HARQ must be sent by the client terminal exactly four subframes after the subframe in which the DL transmission was received. Similarly, the eNB may send a retransmission or a new transmission for a given subframe no sooner than eight subframes after the initial transmission or previous retransmissions. This is referred herein as HARQ Round Trip Delay (RTD) and illustrated in FIG. 5. Similarly in case of FDD UL, the HARQ ACK/NACK must be sent by the eNB exactly four subframes after the subframe in which the UL transmission was performed by a client terminal. The eNB may send an ACK/NACK message exactly four subframe after the reception from the client terminal as illustrated in FIG. 6. The client terminal then in turn sends a retransmission four subframes from the reception of a NACK. If an ACK was received then no retransmission is performed by the client terminal and it waits for new resource allocation through DCI which may occur in the same subframe as the reception of UL ACK/NACK. In summary, the HARQ RTD for DL and UL is at least 8 ms. In case of TDD, the HARQ RTD may be a little different because of the different radio frame structure and because of different TDD configurations. However, the HARQ RTD for TDD may be at least as long as that in FDD, i.e., for TDD, RTD≥8 ms.

Figure 7:
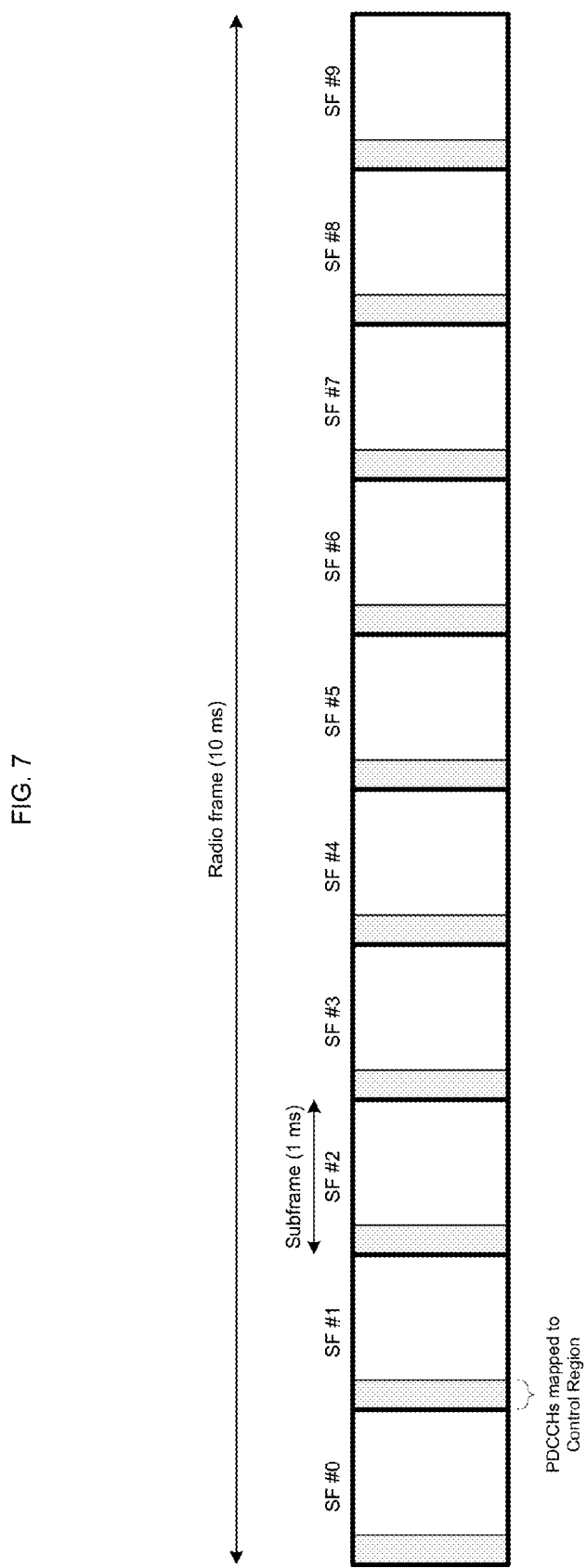
FIG. 7 illustrates a radio frame and its subframes in a 3GPP LTE wireless communication system air interface.

A method and apparatus are disclosed that can filter out invalid DCI messages. According to an aspect of the present invention, the invalid DCI messages may be detected based on the HARQ information contained in them. Some invalid DCI messages may be identified by verifying the content of currently received DCI message. According to the aspects of the present invention an invalid DCI message may be detected based on previously received successful DCI messages and the currently received DCI message. The time instant at which a DCI is received may be denoted as Transmission Time Interval (TTI) which consists of the Radio Frame Number (RFN) and Subframe Number (SFN). According to 3GPP LTE wireless communication system, the RFN ranges from 0 to 1023 and the SFN from 0 to 9. A radio frame consists of ten subframes as shown in FIG. 7 and denoted as NUM_SF_PER_FRAME herein. A TTI is often represented by a pair (RFN, SFN) or as a single number obtained by (10*RFN)+SFN.

According to an aspect of the present invention the current TTI, previous TTI, minimum HARQ RTD, HARQ information and the DCI validity flag are maintained in a context buffer for each HARQ process in DL and UL. According to another aspect of the invention, the minimum HARQ RTD is computed dynamically. In case of a TDD mode of 3GPP LTE wireless communication system, the dynamic computation may be a function of the TDD configuration and the DL subframe number in which the DCI may be received according to the table contained in FIG. 8. According to the another aspect of the invention, the minimum HARQ RTD computed in current DL SF is stored in the HARQ context buffer corresponding to DL HARQ process number received in DCI of current DL SF. According to an aspect of the present invention, the DCI validity flag in the HARQ context buffer is updated in each subframe in which the particular HARQ process related DCI is received. According to an aspect of the present invention, the DCI validity flag derived in a current TTI is only used to validate a future DCI message from a future TTI whenever the same HARQ process number as in the current DCI message from the current TTI is received in the future DCI message. According to another aspect of the present invention, the DCI validity flag may be set to true only if the DCI detected in current TTI is a valid DCI as described below.

According to an aspect of the present invention, the HARQ context buffer may be used to determine the validity of DCI only if the DCI validity flag in the HARQ context buffer is true. According to the aspects of the present invention, if the CRC of the PDSCH assigned by the DCI is valid for at least one of the code blocks of one or both the codewords associated with the current HARQ process, the DCI validity in the HARQ context buffer for that HARQ process is set to true. According to the aspects of the present invention, if PDSCH CRC status fails for all the codewords associated with current HARQ process and if any one of the codewords corresponds to retransmission and if the MCS received in the DCI is less than 29, the DCI validity in the HARQ context buffer is set to true. Value of MCS greater than 29 indicates a retransmission which may not be valid if there was no initial transmission preceding the DCI indicating retransmission. According to the aspects of the present invention, if PDSCH CRC status fails for all the codewords associated with current HARQ process and if all the codewords correspond to initial transmission, the DCI validity in the HARQ context buffer is set to false.

According to an aspect of the invention, the DCI validity flag in HARQ context buffer is initialized to false for all the HARQ processes at the start of client terminal's Connected mode as defined in 3GPP LTE specifications. According to an aspect of the invention, the DCI validity flag in the HARQ context buffer is initialized to false if the receive window is closed for more than a configurable number of subframes.

According to an aspect of the present invention, if the DCI validity flag in the HARQ context buffer is true, the minimum HARQ RTD check is performed to detect whether the DCI received in current TTI is valid or invalid. If the HARQ RTD requirement is not met, the DCI is filtered out as invalid.

According to an aspect of the present invention, the previous TTI in the HARQ context buffer is updated only if the DCI is a valid DCI i.e., not filtered out as an invalid DCI by any of the invalid DCI conditions described above. According to an aspect of the present invention, if the DCI validity flag in the HARQ context buffer is true, then the previous TTI may be updated with the value of the current TTI else it may not be updated. According to an aspect of the present invention, the previous TTI in the HARQ context buffer is updated with current TTI only if PDSCH CRC pass is obtained. This is performed to avoid invalid DCI updating the previous TTI, which may lead to invalidation of a valid DCI received in the same HARQ process number in the subsequent subframes.

The difference between the current TTI and previous TTI may be negative in the case of radio frame number wrap around boundary, i.e., when the RFN increments from 1023 to 0. According to another aspect on the invention, to handle the wrap around scenario, if the difference between the current TTI and previous TTI is negative then 10240

(1024*NUM_SF_PER_FRAME) may be added to the difference and then it may be compared with the minimum HARQ RTD.

According to another aspect of the invention the invalid DCI filtering based on HARQ RTD and the parameters of the invalid DCI filtering may be configured by software.

Figure 9:
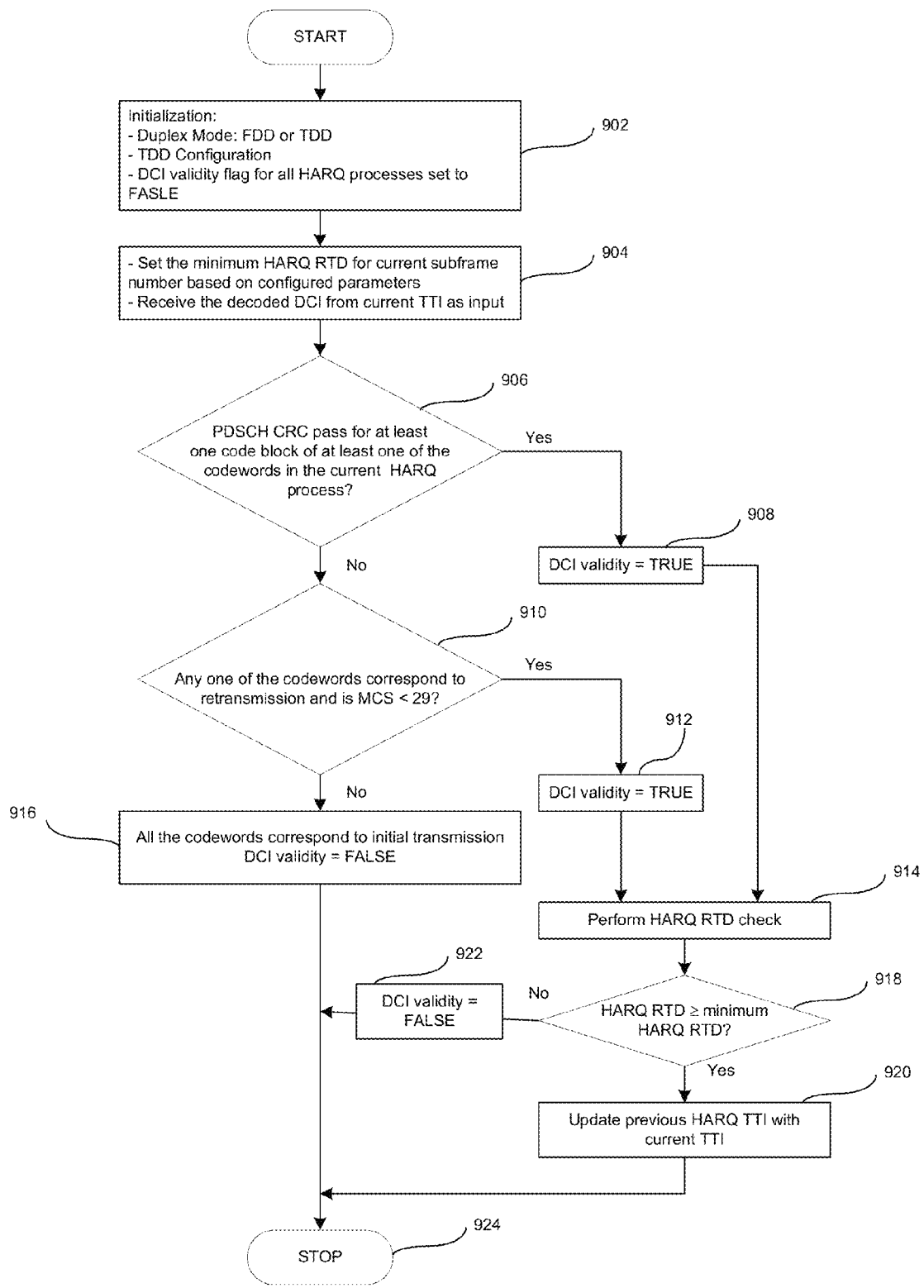
FIG. 9 illustrates the flow diagram for the processing steps according to aspects of the present invention.

The flow diagram 900 contained in FIG. 9 illustrates the invalid DCI filtering method according to the aspects of the present invention. The processing relevant to the present invention begins in processing stage 902, where the parameters required for the filtering of invalid DCI are initialized. Specifically, the duplexing mode currently in use and in case the duplexing mode is TDD the particular TDD configuration in use are initialized. The DCI validity flag for all the HARQ processes is set to FALSE. The rest of the processing is performed for each subframe. At processing stage 904, the minimum HARQ RTD is determined using the table contained in FIG. 8 for the current subframe and duplexing scheme and the decoded DCI for the current TTI is received as input. At processing stage 906, the status of the PDSCH decoding allocated by the DCI in the current TTI is checked. Specifically it is determined whether the PDSCH CRC passes for at least one code block of at least one of the codewords in the current TTI is passing or not. If at least one of the code block CRC is passing, the processing proceeds to stage 908 where the DCI received in current TTI is considered valid and the DCI validity flag for the current HARQ process context buffer is set to TRUE and the processing progresses to stage 914. Returning to the processing stage 906, if none of the code block CRC is passing the processing progresses to stage 910. At processing stage 910, a determination is made whether any one of the codewords in current TTI is a retransmission and whether the MCS is less than 29. If any one of the codewords in current TTI is a retransmission or MCS is greater than or equal to 29, the processing advances to processing stage 912 where the DCI received in current TTI is considered valid and the DCI validity flag for the current HARQ process context buffer is set to TRUE and the processing progresses to stage 914. Returning to the processing stage 910, if all the codewords correspond to initial transmission, the processing progresses to stage 916 where the DCI validity is set to FALSE. The processing then terminates at stage 924.

Returning to the processing stage 914, the minimum HARQ RTD is checked against actual HARQ RTD based on the current TTI and previous TTI. Note that the HARQ RTD check can only be performed if the DCI validity is TRUE for the HARQ context buffer corresponding to the HARQ process number of the current DCI. If the actual HARQ RTD is less than the minimum HARQ RTD, the DCI is considered to be invalid and the processing progresses to stage 922. At processing stage 922, the DCI validity is set to FASLE. The processing then terminates at stage 924. If the actual HARQ RTD is greater than or equal to the minimum HARQ RTD, the DCI is considered to be valid and the processing progresses to stage 920. At processing stage 920, the previous TTI of the HARQ context buffer is updated to the current TTI for the buffer corresponding to the HARQ process in the current DCI. The processing then terminates at stage 924.

By way of example only, the above-described method may be implemented in a receiver, e.g., a user device such as a wireless mobile station (MS) 12 as shown in FIG. 1.

Figure 10:
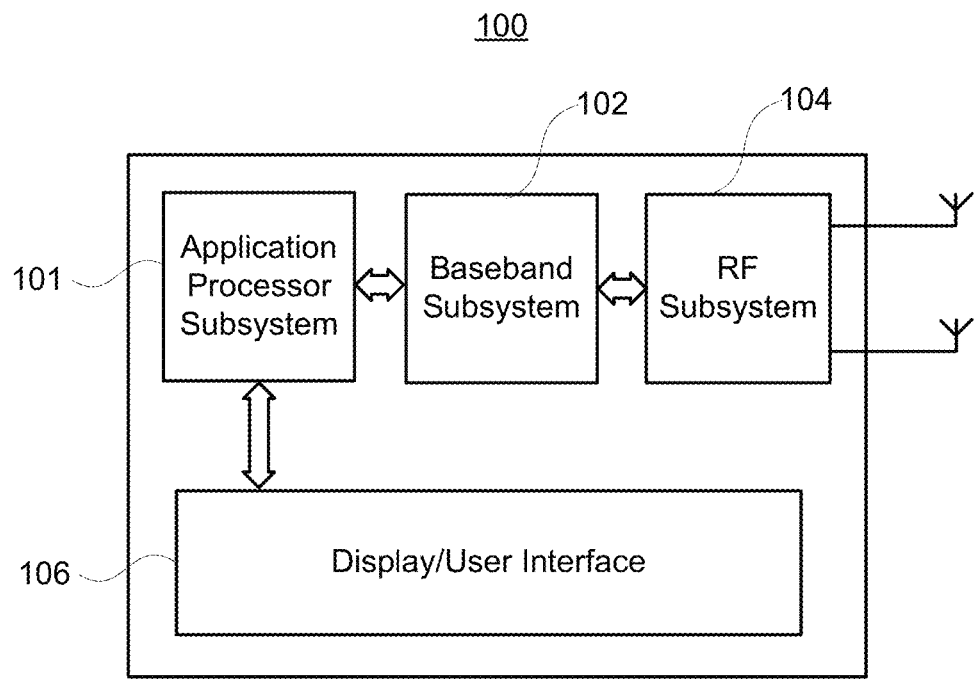
FIG. 10 illustrates a wireless mobile station diagram, which may be employed with aspects of the invention described herein.

As shown in FIG. 10, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 11:
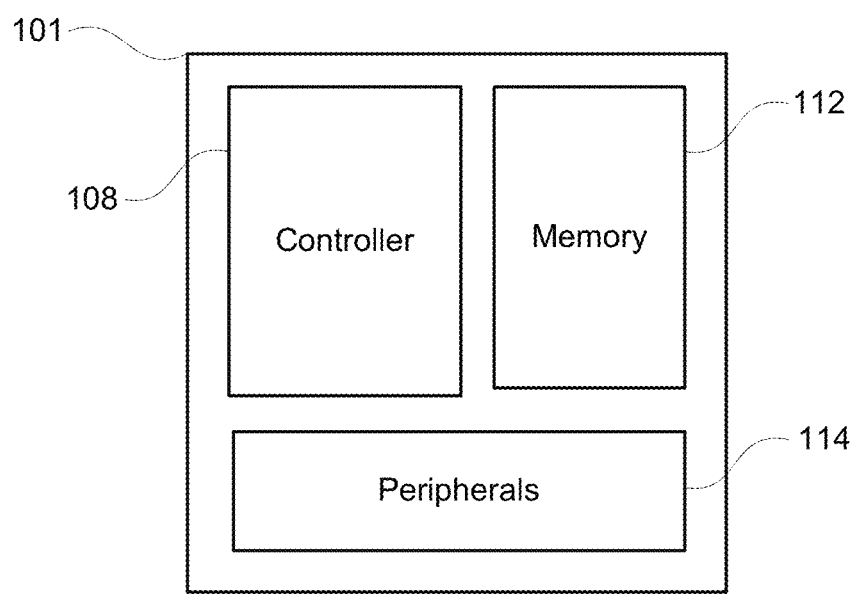
FIG. 11 illustrates an application processor subsystem for a wireless mobile station, which may be employed with aspects of the invention described herein.
Figure 12:
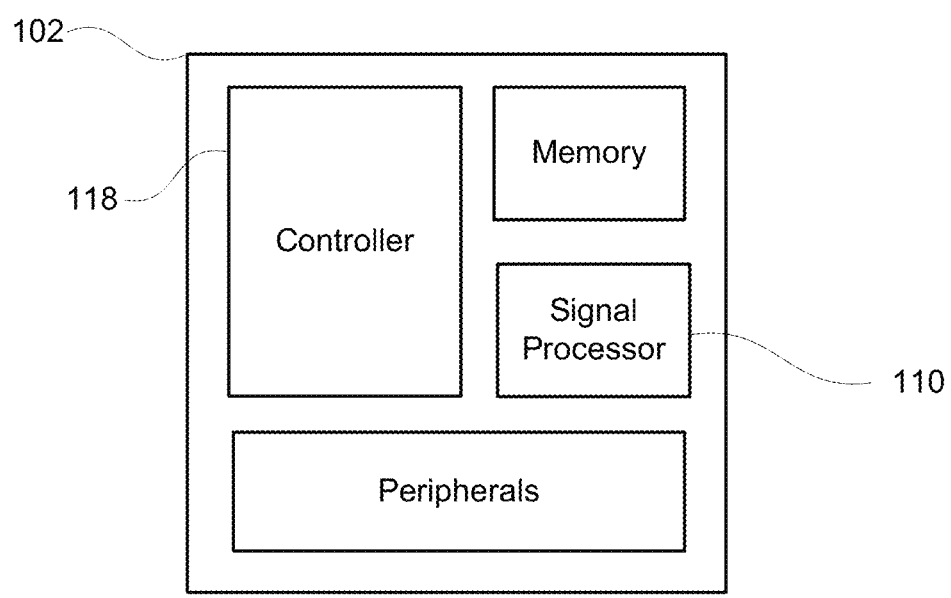
FIG. 12 illustrates a baseband subsystem for a wireless mobile station, which may be employed with aspects of the invention described herein.
Figure 13:
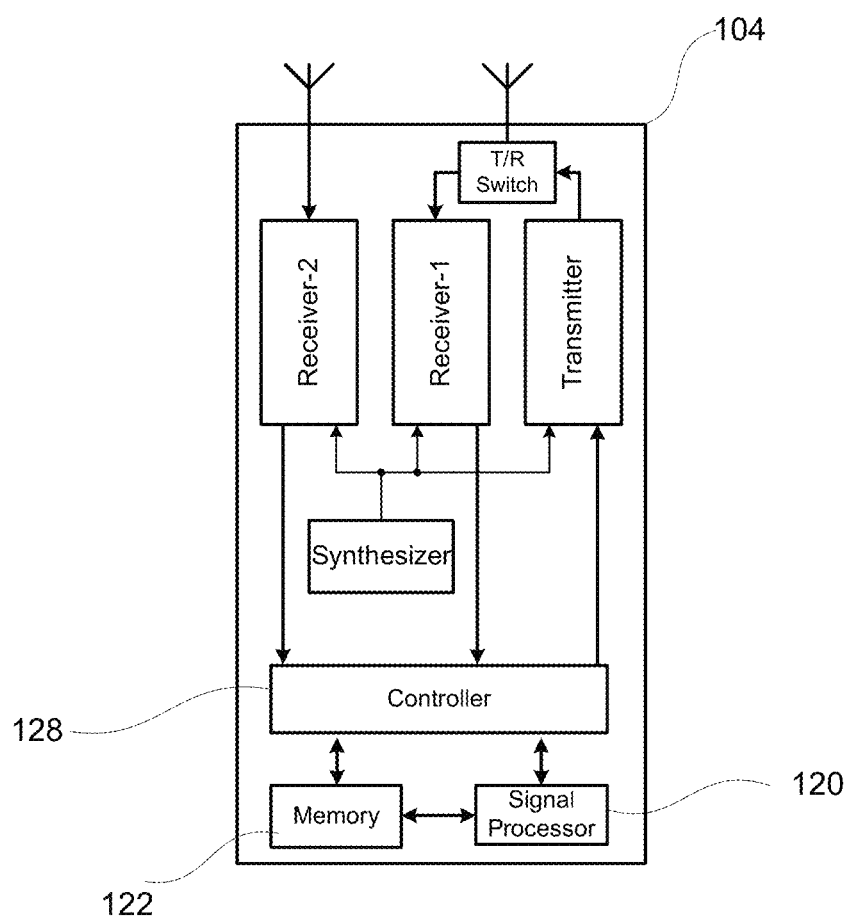
FIG. 13 illustrates an RF subsystem for a wireless mobile station, which may be employed with aspects of the invention described herein.

The application processor subsystem 101 as shown in FIG. 11 may include a controller 108 such as a microcontroller another processor or other circuitry. The baseband subsystem 102 as shown in FIG. 12 may include a controller 118 such as a microcontroller or other processor. The RF subsystem 104 as shown in FIG. 13 may include a controller 128 such as a microcontroller, another processor or other circuitry. The controller 108 desirably handles overall operation of the MS 100. This may be done by any combination of hardware, software and firmware running on the controller 108. Such a combination of hardware, software and firmware may embody any methods in accordance with aspects of the present invention.

Peripherals 114 such as a full or partial keyboard, video or still image display, audio interface, etc may be employed and managed through the controller 108.

Aspects of the present invention may be implemented in firmware of the controller 108 of the application processor and/or the controller 118 of the baseband subsystem. In another alternative, aspects of the present invention may also be implemented as a combination of firmware and hardware of the application processor subsystem 101 and/or the baseband subsystem 102. For instance, a signal processing entity of any or all of the FIG. 12 may be implemented in firmware, hardware and/or software. It may be part of the baseband subsystem, the receiver subsystem or be associated with both subsystems. In one example, the controller 118 and/or the signal processor 110 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use the aspects of the invention may include smartphones, tablets, laptops, gaming consoles, cameras, video camcorders, TV, car entertainment systems, etc.

Although aspects of the invention herein have been described with reference to particular embodiments, it is to be understood that these embodiments are merely illustrative of the principles and applications of the aspects of the present invention. It is therefore to be understood that numerous modifications may be made to the illustrative embodiments and that other arrangements may be devised without departing from the spirit and scope of the aspects of the present invention as defined by the appended claims. Aspects of each embodiment may be employed in the other embodiments described herein.

The invention claimed is:

1. A method for validating a Downlink Control Information (DCI) message in a wireless communication system, the method comprising:

controlling, by a processing device, for a given subframe in which a DCI message is encoded and which is received at a wireless communication terminal of the wireless communication system, determining whether error correction and detection decoding of at least one code block of at least one codeword of a Physical Downlink Shared Channel (PDSCH) corresponding to a current DCI message from a current transmission time interval (TTI) is passing a Cyclic Redundancy Check (CRC); and controlling, by the processing device, setting of a DCI validity flag, for the given subframe, to indicate:

True when:
  (i) at least one of the at least one code blocks decoded by the error correction and detection decoding is determined to be passing the CRC so as to satisfy a first condition of passing the CRC, or any of the at least one codeword corresponds to retransmission and a Modulation and Coding Scheme (MCS) value indicated in the current DCI message is less than a predetermined value so as to satisfy a second condition of the MSC value is less than the predetermined value, and
  (ii) an actual Hybrid Automatic Repeat Request (HARQ) Round Trip Delay (RTD) determined from the current TTI and a previous TTI for a previously validated DCI message is greater than or equal to a minimum HARQ RTD for the given subframe, and False when:
  (iii) none of the at least one code blocks decoded by the error correction and detection decoding is determined to pass the CRC, none of the at least one codeword corresponds to retransmission and the MCS value is not less than the predetermined value, or
  (iv) the actual HARQ RTD is not greater than or equal to the minimum HARQ RTD when the first condition or the second condition of (i) is satisfied.

2. The method of claim 1, further comprising:
when the DCI validity flag indicates True based on the setting, controlling, by the processing device, updating of a HARQ context buffer for the previous TTI stored in a memory to the current TTI for a HARQ context buffer stored in the memory corresponding to a HARQ process in the current DCI message.

3. The method of claim 1, further comprising:
when the DCI validity flag indicates False based on the setting, controlling, by the processing device, updating of a HARQ context buffer for the previous TTI stored in a memory such that the HARQ context buffer for the previous TTI is not updated to the current TTI for a HARQ context buffer stored in the memory corresponding to a HARQ process in the current DCI message.

4. The method of claim 1,
wherein the processing device controls storing in a memory, for the given subframe in downlink (DL) and uplink (UL), the current TTI, the minimum HARQ RTD and information indicating the MCS value and transmission or retransmission.

5. The method of claim 1,
wherein the minimum HARQ RTD for the given subframe is determined dynamically.

6. The method of claim 5,
wherein, when the wireless communication system is of a Time Division Duplexing (TDD) mode, the minimum HARQ RTD for the given subframe is determined as a function of TDD configuration and a downlink (DL) subframe number (SFN) for the current DCI message from a table stored in a memory.

7. The method of claim 5, further comprising:
storing in a memory, by the processing device, the minimum HARQ RTD for the given subframe which is a current downlink (DL) subframe (SF) corresponding to a DL HARQ process number indicated in the current DCI message of the current DL SF.

8. The method of claim 1,
wherein information of the current DCI message for which the DCI validity flag indicates True is used by the processing device to set a DCI validity flag for a subsequent DCI message from a subsequent TTI, only when a same process number is indicated in the current DCI message and the subsequent DCI message.

9. The method of claim 1, wherein information of HARQ for the previously validated DCI message stored in a memory indicates a setting of True for a DCI validity flag corresponding to the previously validated DCI message.

10. The method of claim 1,
wherein the setting updates the DCI validity flag to True from an initial setting of False when at least one of the at least one code blocks decoded by the error correction and detection decoding is determined to be passing the CRC, or any of the at least one codeword corresponds to the retransmission and the MCS value is less than the predetermined value, and
wherein the processing device determines whether (ii) is satisfied only when the DCI validity flag is updated to indicate True, and updates the DCI validity flag to indicate False when (ii) is determined to be not satisfied.

11. The method of claim 10,
wherein, when the DCI validity flag is updated to indicate False based on a determination (ii) is not satisfied, the processing device controls storing in a memory information for the current DCI message indicating the current DCI message is invalid.

12. The method of claim 1,
wherein the setting updates the DCI validity flag to True from an initial setting of False when at least one of the at least one code blocks decoded by the error correction and detection decoding is determined to be passing the CRC.

13. The method of claim 1,
wherein the setting updates the DCI validity flag to True from an initial setting of False when (i) none of the at least one code blocks is determined to be passing the CRC and (ii) any of the at least one codeword corresponds to the retransmission and the MCS value is less than the predetermined value.

14. The method of claim 1,
wherein the setting updates the DCI validity flag to False from an initial setting of False when (i) none of the at least one code blocks decoded by the error correction and detection decoding is determined to be passing the CRC and (ii) all of the at least one codeword correspond to initial transmission.

15. The method of claim 1,
wherein the processing device updates a HARQ context buffer for the previous TTI stored in a memory to the current TTI for a HARQ context buffer stored in the memory corresponding to a HARQ process in the current DCI message, only when at least one of the at least one code blocks decoded by the error correction and detection decoding is determined to be passing the CRC.

16. An apparatus for validating a Downlink Control Information (DCI) message in a wireless communication system, the apparatus comprising:
circuitry configured to control:

determining, for a given subframe in which a DCI message is encoded and which is received at a wireless communication terminal of the wireless communication system, whether error correction and detection decoding of at least one code block of at least one codeword of a Physical Downlink Shared Channel (PDSCH) corresponding to a current DCI message from a current transmission time interval (TTI) is passing a Cyclic Redundancy Check (CRC); and setting of a DCI validity flag, for the given subframe, to indicate True when:
- (i) at least one of the at least one code blocks decoded by the error correction and detection decoding is determined to be passing the CRC so as to satisfy a first condition of passing the CRC, or any of the at least one codeword corresponds to retransmission and a Modulation and Coding Scheme (MCS) value indicated in the current DCI message is less than a predetermined value so as to satisfy a second condition of the MSC value is less than the predetermined value, and
- (ii) an actual Hybrid Automatic Repeat Request (HARQ) Round Trip Delay (RTD) determined from the current TTI and a previous TTI for a previously validated DCI message is greater than or equal to a minimum HARQ RTD for the given subframe, and False when:
- (iii) none of the at least one code blocks decoded by the error correction and detection decoding is determined to pass the CRC, none of the at least one codeword corresponds to retransmission and the MCS value is not less than the predetermined value, or
- (iv) the actual HARQ RTD is not greater than or equal to the minimum HARQ RTD when the first condition or the second condition of (i) is satisfied.

17. The apparatus of claim 16,
wherein the circuitry is configured to control, when the DCI validity flag indicates True based on the setting, updating of a HARQ context buffer for the previous TTI stored in a memory to the current TTI for a HARQ context buffer stored in the memory corresponding to a HARQ process in the current DCI message.

18. The apparatus of claim 16,
wherein the circuitry is configured to control, when the DCI validity flag indicates False based on the setting, updating of a HARQ context buffer for the previous TTI stored in a memory such that the HARQ context buffer for the previous TTI is not updated to the current TTI for a HARQ context buffer stored in the memory corresponding to a HARQ process in the current DCI message.

19. The apparatus of claim 16,
wherein the setting updates the DCI validity flag to True from an initial setting of False when at least one of the at least one code blocks decoded by the error correction and detection decoding is determined to be passing the CRC, or any of the at least one codeword corresponds to the retransmission and the MCS value is less than the predetermined value, and
wherein the circuitry is configured to control determining whether (ii) is satisfied only when the DCI validity flag is updated to indicate True, and updating the DCI validity flag to indicate False when (ii) is determined to be not satisfied.

20. The apparatus of claim 16,
wherein the circuitry is configured to control updating a HARQ context buffer for the previous TTI stored in a memory to the current TTI for a HARQ context buffer stored in the memory corresponding to a HARQ process in the current DCI message, only when at least one of the at least one code blocks decoded by the error correction and detection decoding is determined to be passing the CRC.

21. A wireless communication device comprising:
a receiver to receive a given subframe in which a DCI message is encoded; and
a processing device configured to control for the given subframe received in which a DCI message is encoded:
determining whether error correction and detection decoding of at least one code block of at least one codeword of a current DCI message from a current transmission time interval (TTI) is passing a Cyclic Redundancy Check (CRC); and
setting of a DCI validity flag to indicate
True when:
- (i) at least one of the at least one code blocks decoded by the error correction and detection decoding is determined to be passing the CRC so as to satisfy a first condition of passing the CRC, or any of the at least one codeword corresponds to retransmission and a Modulation and Coding Scheme (MCS) value indicated in the current DCI message is less than a predetermined value so as to satisfy a second condition of the MSC value is less than the predetermined value, and
- (ii) an actual Hybrid Automatic Repeat Request (HARQ) Round Trip Delay (RTD) determined from the current TTI and a previous TTI for a previously validated DCI message is greater than or equal to a minimum HARQ RTD for the given subframe, and False when:
- (iii) none of the at least one code blocks decoded by the error correction and detection decoding is determined to pass the CRC, none of the at least one codeword corresponds to retransmission and the MCS value is not less than the predetermined value, or
- (iv) the actual HARQ RTD is not greater than or equal to the minimum HARQ RTD when the first condition or the second condition of (i) is satisfied.

22. The device of claim 21,
wherein the processing device is configured to control, when the DCI validity flag indicates True based on the setting, updating of a HARQ context buffer for the previous TTI stored in a memory to the current TTI for a HARQ context buffer stored in the memory corresponding to a HARQ process in the current DCI message.

23. The device of claim 21,
wherein the processing device is configured to control, when the DCI validity flag indicates False based on the setting, updating of a HARQ context buffer for the previous TTI stored in a memory such that the HARQ context buffer for the previous TTI is not updated to the current TTI for a HARQ context buffer stored in the memory corresponding to a HARQ process in the current DCI message.

24. The device of claim 21,
wherein the setting updates the DCI validity flag to True from an initial setting of False when at least one of the at least one code blocks decoded by the error correction and detection decoding is determined to be passing the CRC, or any of the at least one codeword corresponds to the retransmission and the MCS value is less than the predetermined value, and
wherein the processing device is configured to control determining whether (ii) is satisfied only when the DCI validity flag is updated to indicate True, and updating the DCI validity flag to indicate False when (ii) is determined to be not satisfied.

25. The device of claim 21,
wherein the processing device is configured to control updating a HARQ context buffer for the previous TTI stored in a memory to the current TTI for a HARQ context buffer stored in the memory corresponding to a HARQ process in the current DCI message, only when at least one of the at least one code blocks decoded by the error correction and detection decoding is determined to be passing the CRC.

\* \* \* \* \*